United States Patent
Tseng et al.

(10) Patent No.: US 9,775,128 B2
(45) Date of Patent: Sep. 26, 2017

(54) VEHICULAR CONNECTIVITY MAP

(71) Applicant: Ford Global Technologies, LLC, Dearborn, MI (US)

(72) Inventors: Fling Finn Tseng, Ann Arbor, MI (US); Dimitar Petrov Filev, Novi, MI (US); Imad Hassan Makki, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/003,432

(22) Filed: Jan. 21, 2016

(65) Prior Publication Data

US 2017/0215165 A1 Jul. 27, 2017

(51) Int. Cl.
*H04W 24/00* (2009.01)
*H04W 64/00* (2009.01)
*G07C 5/02* (2006.01)

(52) U.S. Cl.
CPC ............ *H04W 64/006* (2013.01); *G07C 5/02* (2013.01)

(58) Field of Classification Search
CPC ............................... H04W 64/006; G07C 5/02
USPC .......... 455/456.4, 456.3, 418, 414.1
See application file for complete search history.

(56) References Cited

U.S. PATENT DOCUMENTS

| | | | |
|---|---|---|---|
| 6,597,906 B1 | 7/2003 | Van Leeuwen et al. | |
| 7,305,236 B2 * | 12/2007 | Schwinke | H04W 24/00 379/32.01 |
| 7,428,460 B2 | 9/2008 | Atarashi et al. | |
| 7,739,037 B2 * | 6/2010 | Sumizawa | G01C 21/32 701/439 |
| 8,386,163 B2 * | 2/2013 | Severson | G01C 21/3608 340/995.19 |
| 8,417,239 B1 | 4/2013 | DeCusatis et al. | |
| 8,428,876 B2 * | 4/2013 | Lee | G01C 21/32 701/451 |
| 9,045,145 B2 * | 6/2015 | Filev | B62D 6/007 |
| 9,091,563 B2 | 7/2015 | Seino | |
| 9,463,804 B2 * | 10/2016 | Szwabowski | B60W 40/072 |
| 9,469,343 B2 * | 10/2016 | Kim | B62D 15/025 |
| 9,493,171 B2 * | 11/2016 | Filev | B60W 50/16 |

(Continued)

FOREIGN PATENT DOCUMENTS

| | | |
|---|---|---|
| CN | 102426798 A | 4/2012 |
| EP | 1045224 A2 | 10/2000 |
| GB | 2525750 | 11/2015 |

OTHER PUBLICATIONS

Leo Kent, Here introduces HD maps for highly automated vehicle testing, HERE 360, the official HERE blog, Jul. 20, 2015, http://360.here.com/2015/07/20/here-introduces-hd-maps-for-highly-automated-vehicle-testing/.

(Continued)

*Primary Examiner* — Marceau Milord
(74) *Attorney, Agent, or Firm* — James P. Muraff; Neal Gerber & Eisenberg LLP

(57) ABSTRACT

The present disclosure relates to a connectivity system with: (a) a vehicle including an accelerator, brakes, steering, a cellular network antenna, a processor, and memory; (b) a connectivity program operatively coupled with the vehicle antenna and configured to: receive a connectivity map, sample connectivity, transmit the samples, anticipate connectivity based on the connectivity map, and generate an instruction for another program based on the anticipated connectivity.

17 Claims, 7 Drawing Sheets

(56) References Cited

U.S. PATENT DOCUMENTS

| | | | |
|---|---|---|---|
| 9,497,729 B2 * | 11/2016 | Lavi | H04W 64/006 |
| 2010/0240346 A1 | 9/2010 | Jain et al. | |
| 2013/0035083 A1 | 2/2013 | Kadel | |
| 2013/0141247 A1 * | 6/2013 | Ricci | G06F 9/54 |
| | | | 340/870.01 |
| 2013/0158821 A1 | 6/2013 | Ricci | |
| 2013/0166159 A1 * | 6/2013 | Kondoh | G06F 17/00 |
| | | | 701/51 |
| 2014/0200038 A1 | 7/2014 | Rao et al. | |
| 2014/0309866 A1 * | 10/2014 | Ricci | B60Q 1/00 |
| | | | 701/36 |
| 2014/0309868 A1 * | 10/2014 | Ricci | B60Q 1/00 |
| | | | 701/36 |
| 2015/0168151 A1 | 6/2015 | Lim et al. | |

OTHER PUBLICATIONS

Search Report dated Jun. 26, 2017 for GB Patent Application No. GB1701040.6 (5 pages).

* cited by examiner

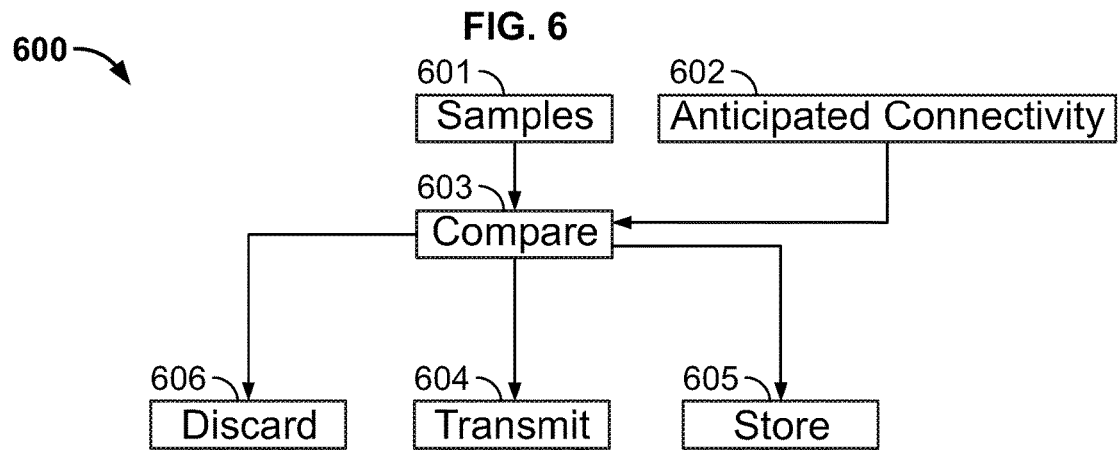
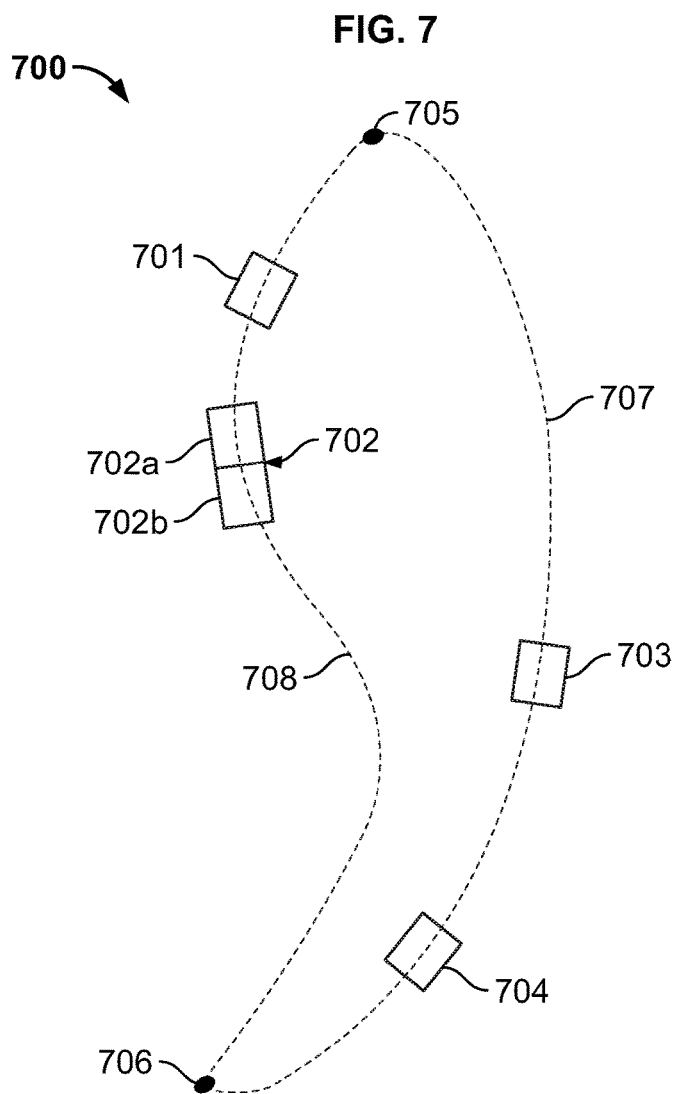

VEHICULAR CONNECTIVITY MAP

TECHNICAL FIELD

This disclosure generally relates to systems and methods for generating, updating, and applying a virtual connectivity map.

BACKGROUND

Newer vehicles wirelessly communicate to improve safety. These newer vehicles often wirelessly communicate via existing cellular networks that accommodate mobile phones. Two examples are AT&T's cellular networks and Verizon's cellular networks.

In some cases, for various reasons, cellular coverage in a certain areas is poor. This is often the case in rural areas, but it can also be true in populated areas, such as cities. For example, cellular networks may react in unexpected or unanticipated ways in response to new construction, weather, and various other events. Unexpected cellular interference degrades wireless communication of those newer vehicles. In some cases, this impairs safety. Consequently, there is a need for a vehicular connectivity map that maps, records, and anticipates cellular network quality.

SUMMARY

In various embodiments, the present disclosure resolves this need with systems and methods of generating, updating, and applying a vehicular connectivity map.

More specifically, in various embodiments, the present disclosure relates to a connectivity system with: (a) a vehicle including an accelerator, brakes, steering, a cellular network antenna, a processor, and memory; (b) a connectivity program operatively coupled with the vehicle antenna and configured to: receive a connectivity map, sample connectivity, transmit the samples, anticipate connectivity based on the connectivity map, and generate an instruction for another program based on the anticipated connectivity.

In various embodiments, the present disclosure relates to a method of mapping connectivity with a vehicle having an accelerator, brakes, steering, a cellular network antenna, a processor, and memory, comprising: operatively coupling a connectivity program with the vehicle antenna, and with the connectivity program: receiving a connectivity map, sampling connectivity, transmitting the samples, anticipating connectivity based on the connectivity map, and generating an instruction for another program based on the anticipated connectivity.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIG. 6 is a flow chart of a method implemented via the connectivity program.
FIG. 7 illustrates a sampling plan.

DETAILED DESCRIPTION OF EXAMPLE EMBODIMENTS

Figure 1A:
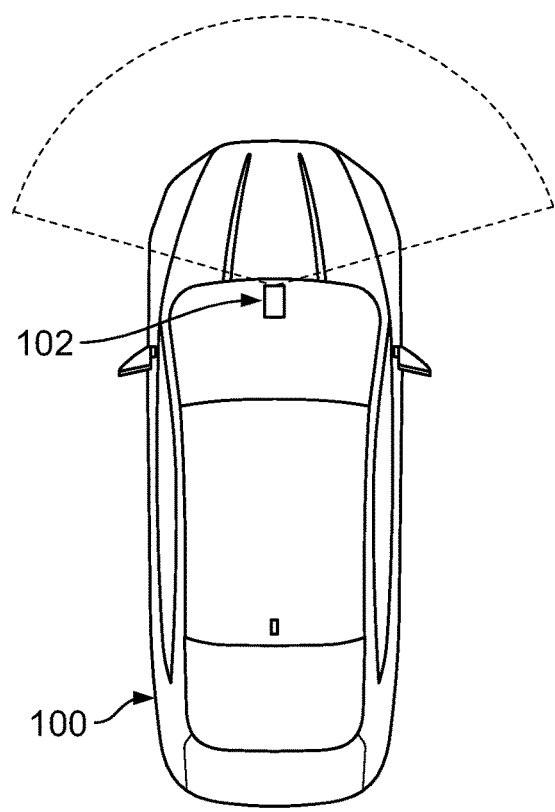
FIG. 1a is a top plan view of a vehicle.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or".

FIG. 1a shows a vehicle 100 in accordance with one embodiment. The vehicle 100 may be a standard gasoline powered vehicle, a hybrid vehicle, an electric vehicle, a fuel cell vehicle, or any other type of suitable vehicle. The vehicle 100 includes standard features (not shown) such as a dashboard, adjustable seats, one or more batteries, an engine or motor, a transmission, an HVAC system including a compressor and electronic expansion valve, a windshield, doors, windows, seatbelts, airbags, and tires.

Figure 1B:
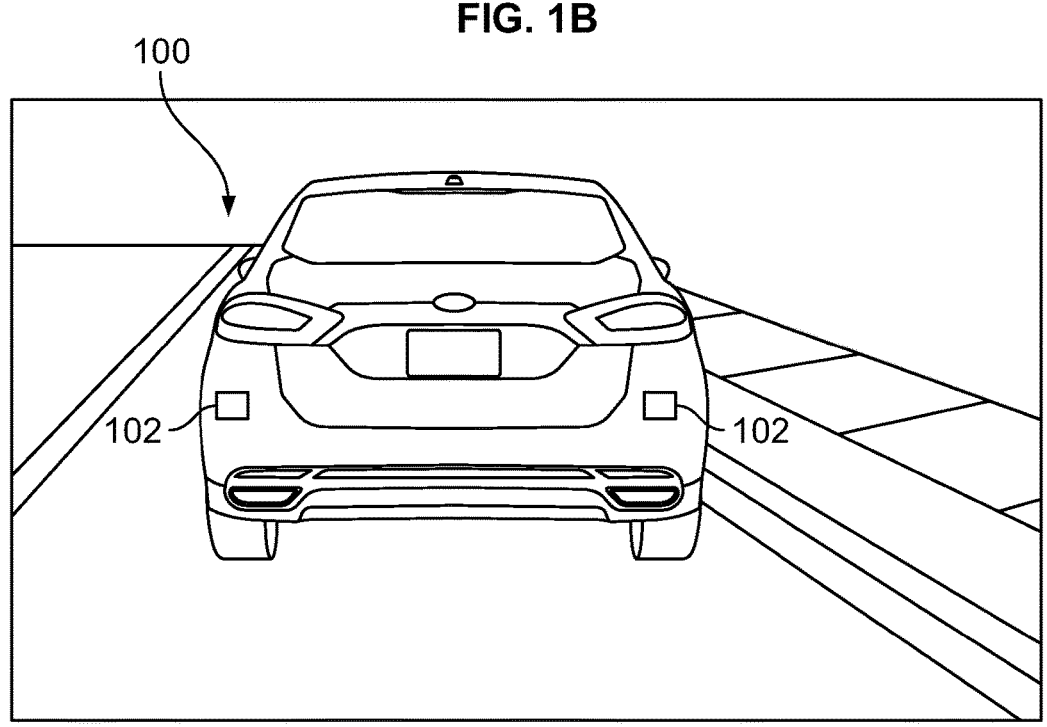
FIG. 1b is a rear perspective view of the vehicle.

The vehicle 100 may include sensors 102. The sensors 102 can be arranged in and around the car in a suitable fashion. The sensors can all be the same or different. There can be many sensors, as shown in FIG. 1b, or only a single sensor. The sensors may include a camera, ultra-sonic sensors, sonar, LiDAR, radar, an optical sensor, or an infrared device configured to measure properties around the exterior of the vehicle, as indicated by the dashed lines 104a and 104b in FIG. 1a. Some sensors 102 may be mounted inside the passenger compartment of the vehicle 100, on the outside or exterior of the vehicle, or in the engine compartment of the vehicle 100. At least one sensor 102 may be used to identify the vehicle's driver via facial recognition, speech recognition, or communication with a device, such as a vehicle key or mobile phone personal to the driver. The sensors may have an OFF state and various ON states. The vehicle 100, or a device operatively connected to the vehicle, may be configured to control the states or activity of the sensors.

Figure 2:
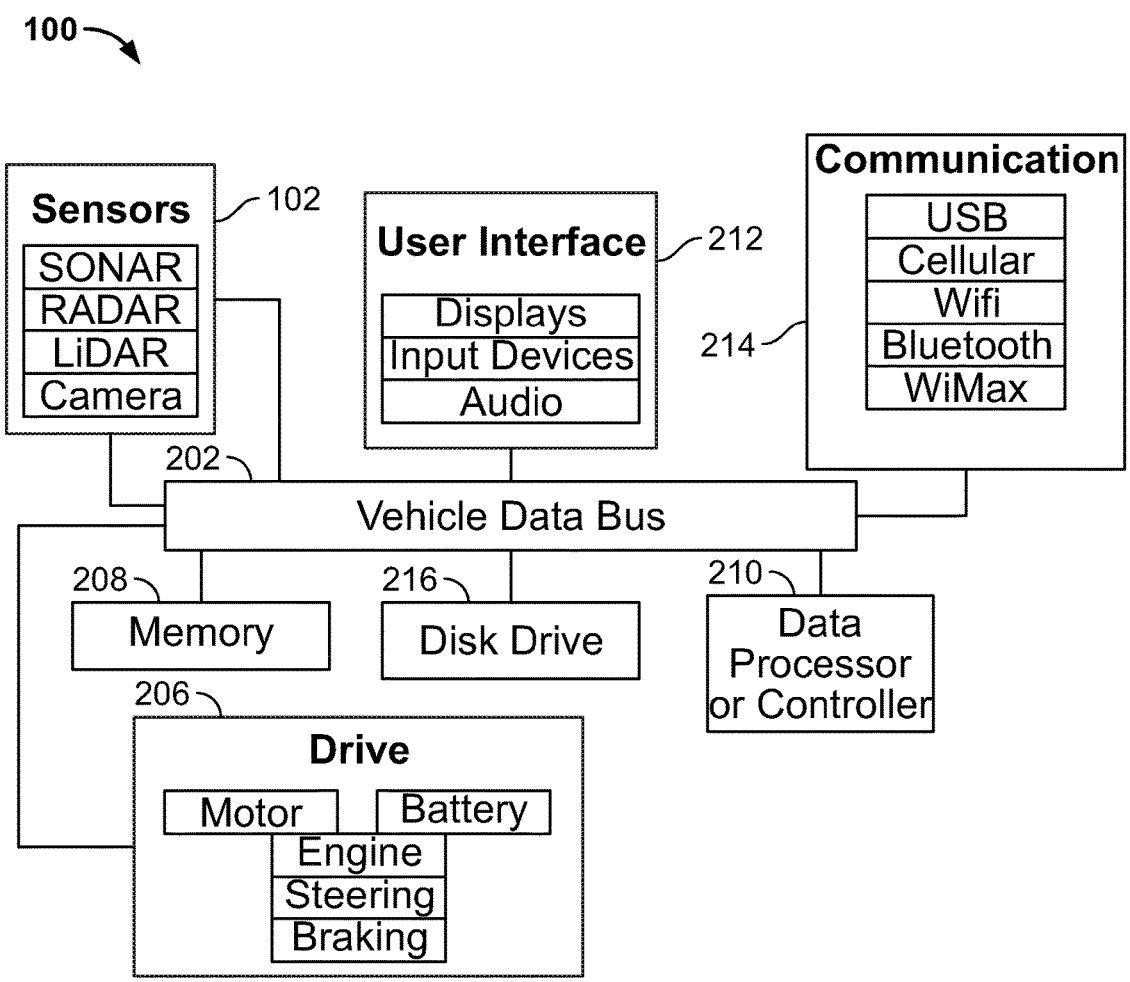
FIG. 2 is a block diagram of electronics included in the vehicle.

As shown in FIG. 2, in one embodiment, vehicle 100 includes a vehicle data bus 202 operatively coupled to the sensors 102, vehicle drive devices 206, memory or data storage 208, a processor or controller 210, a user interface 212, communication devices 214, and a disk drive 216.

The processor or controller 210 may be any suitable processing device or set of processing devices such as, but not limited to: a microprocessor, a microcontroller-based platform, a suitable integrated circuit, or one or more application-specific integrated circuits (ASICs).

The memory 208 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.); unalterable memory (e.g., EPROMs); read-only memory; a hard drive; a solid state hard drive; or a physical disk such as a DVD. In an embodiment, the memory includes multiple kinds of memory, particularly volatile memory a non-volatile memory.

The communication devices 214 may include a wired or wireless network interface, including a cellular antenna, to enable communication with an external network. The external network may be a collection of one or more networks, including standards-based networks (e.g., 2G, 3G, 4G, Universal Mobile Telecommunications Autonomous valet parking system (UMTS), GSM® Association, Long Term Evolution (LTE)™, or more); WiMAX; Bluetooth; near field communication (NFC); WiFi (including 802.11 a/b/g/n/ac or others); WiGig; Global Positioning System (GPS) networks; and others available at the time of the filing of this application or that may be developed in the future. Further, the external network(s) may be a public network, such as the Internet; a private network, such as an intranet; or combinations thereof, and may utilize a variety of networking protocols now available or later developed including, but not limited to, TCP/IP-based networking protocols. The communication devices 214 may also include a wired or wireless interface to enable direct communication with an electronic device, such as a USB or Bluetooth interface. A suitable network may also include a direct vehicle to vehicle network.

The user interface 212 may include any suitable input and output devices. The input devices enable a driver or a passenger of the vehicle to input modifications or updates to information referenced by the various programs as described herein. The input devices may include, for instance, a control knob, an instrument panel, a keyboard, a scanner, a digital camera for image capture and/or visual command recognition, a touch screen, an audio input device (e.g., cabin microphone), buttons, a mouse, or a touchpad. The output devices may include instrument cluster outputs (e.g., dials, lighting devices), actuators, a display (e.g., a liquid crystal display ("LCD"), an organic light emitting diode ("OLED"), a flat panel display, a solid state display, a cathode ray tube ("CRT"), or a heads-up display), and speakers.

The disk drive 216 is configured to receive a computer readable medium. In certain embodiments, the disk drive 216 receives the computer-readable medium on which one or more sets of instructions, such as the software for operating the methods of the present disclosure can be embedded. The instructions may embody one or more of the methods or logic as described herein. In a particular embodiment, the instructions may reside completely, or at least partially, within any one or more of the main memory 208, the computer readable medium, and/or within the processor 210 during execution of the instructions.

The term "computer-readable medium" should be understood to include a single medium or multiple media, such as a centralized or distributed database, and/or associated caches and servers that store one or more sets of instructions. The term "computer-readable medium" also includes any tangible medium that is capable of storing, encoding or carrying a set of instructions for execution by a processor or that cause a system to perform any one or more of the methods or operations disclosed herein.

In one embodiment, connectivity software or program(s) 120 reside(s) in the memory 208 of the vehicle. The connectivity program 120 can send and receive data to and from the sensors 102, the user interface 212, the communication devices 214, the drive 206, or any other component operatively connected to the vehicle data bus 202.

In one embodiment, a mobile phone 105 is operatively connected to the vehicle 100 via any suitable data connection such as WiFi, Bluetooth, USB, or a cellular data connection. In one embodiment, shown in FIG. 3, the mobile phone 105 includes a data bus 302, operatively coupled to sensors 306, components 316, memory or data storage 308, a processor or controller 310, a user interface 312, and communication devices 314. It should be appreciated that the electronic features of the mobile phone 105 may be similar to the features of the vehicle 100 as described above. For example, the communication devices 314 of the mobile phone 105 may operate similar to the communication devices 214 of the vehicle 100. The same applies to the user interface 312, the sensors 306, the data storage 308, the processor 310, and the disk drive 318.

Figure 3:
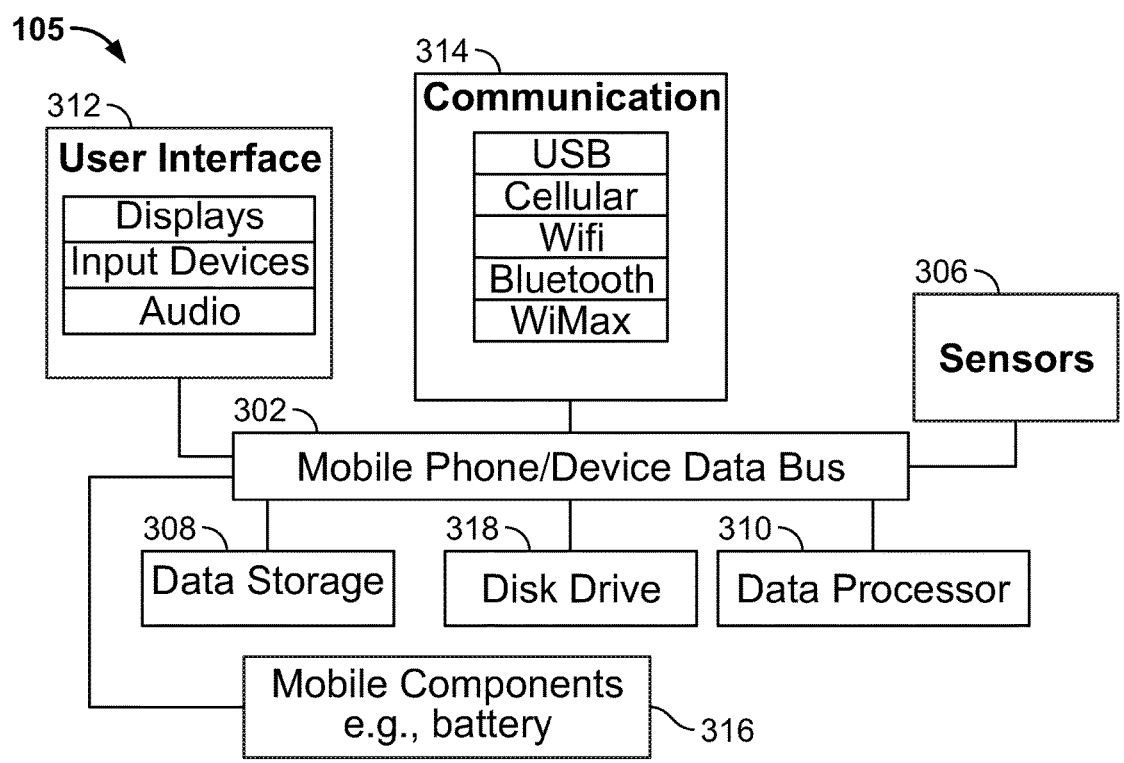
FIG. 3 is a block diagram of electronics included in a mobile phone.
Figure 8:
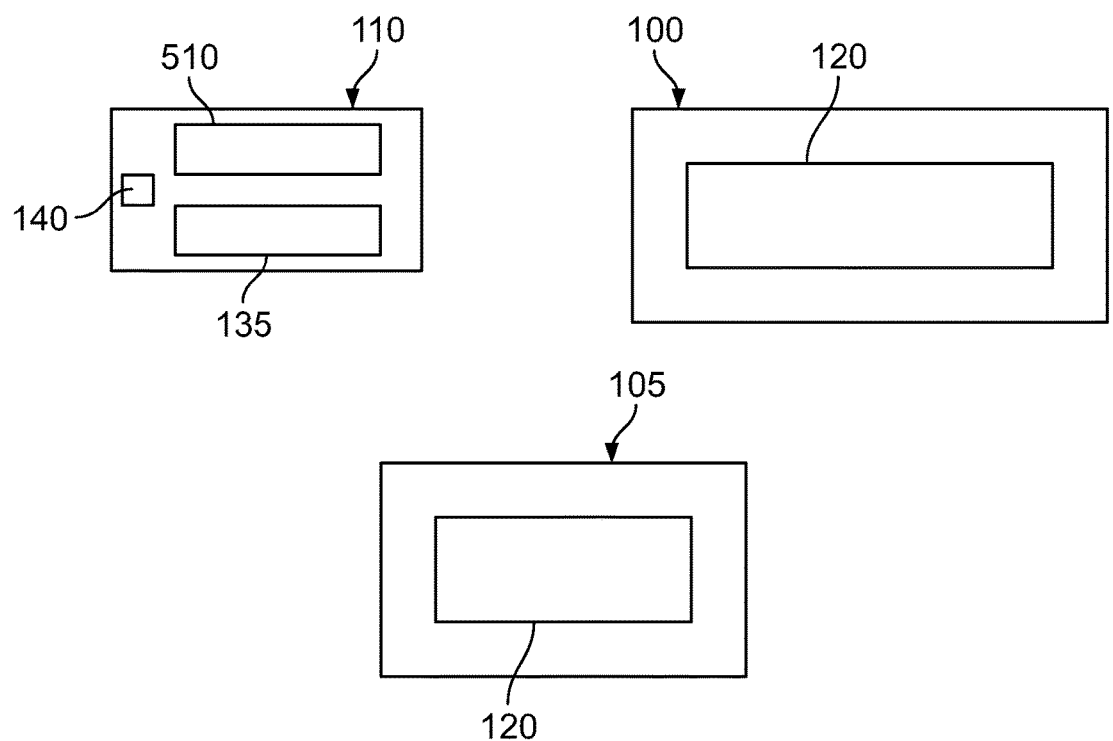
FIG. 8 is a block diagram of various programs.

As shown in FIG. 8, in various embodiments the vehicle 100 or the mobile phone 105 include the connectivity program 120. In these embodiments, the planning program 120 is operatively connected to one or more external servers 110. The external servers host a connectivity map 510, a map updater 135 configured to receive connectivity samples from a plurality of vehicles, and a planning program 140 configured to generate a sampling plan for the plurality of vehicles. In various embodiments, the external servers 110 include electronics similar to the mobile phone 105 as shown in FIG. 3. Upon execution, the programs enable the vehicle 100, the mobile phone 105, and the servers 110 to transmit and receive information to and from any components operatively connected to the processors, including remote devices operatively connected to the processors via the communication devices.

It should thus be appreciated that any program described herein may be stored and executed on the vehicle 100, the mobile phone 105, or an external computer (not shown) operatively connected to the vehicle 100 or the computing device 105.

This disclosure refers to "connectivity." Unless otherwise indicated, "connectivity" may include some or all dimensions of a wireless communication connection. Dimensions include downloading data speed, uploading data speed, downloading data latency, uploading data latency, downloading signal quality, uploading signal quality, carrier (e.g., AT&T, Verizon, or local WiFi), class of connectivity (e.g., EDGE, 3G, 4G, WiMax) and any other dimensions that are commonly used to quantify or describe transmission speed, transmission quality, or transmission latency.

Figure 4:
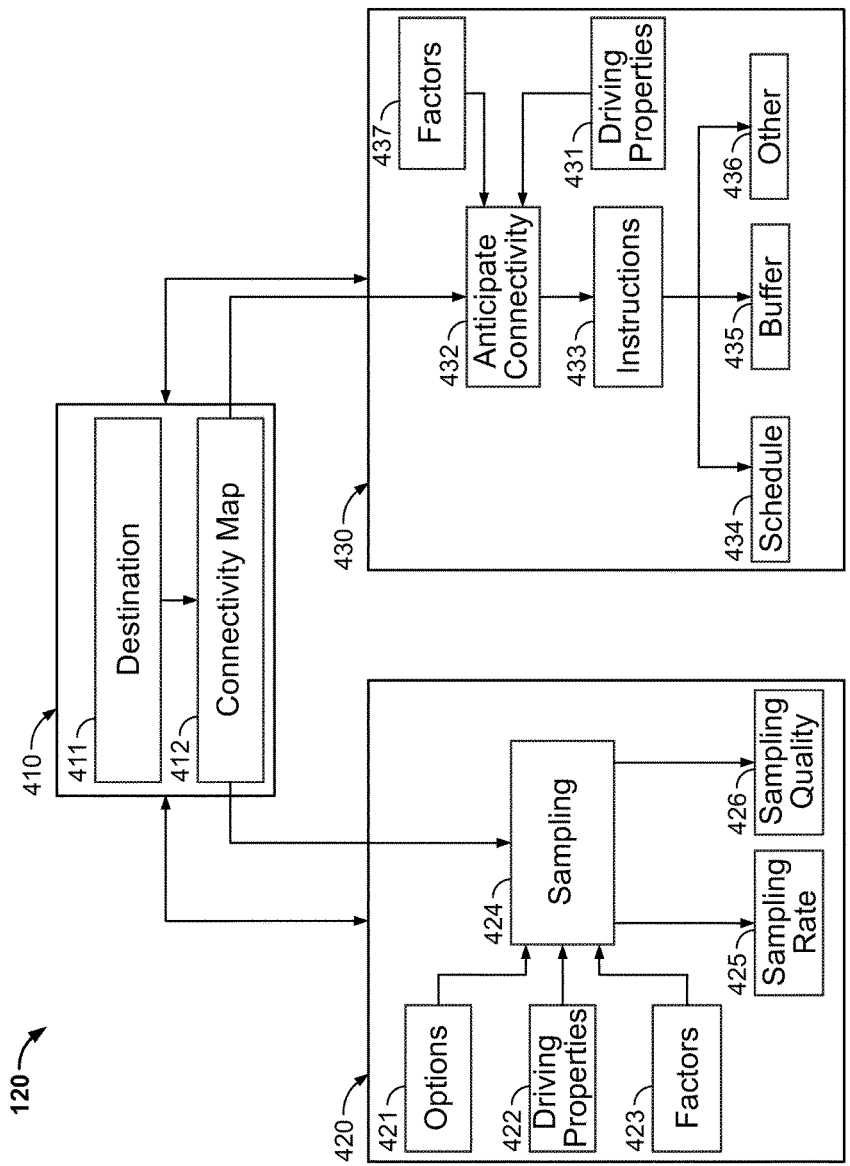
FIG. 4 is a flow chart of a method implemented in a connectivity program.

FIG. 4 shows the connectivity program 120 in more detail. More specifically, three subprograms 410, 420, and 430 of the connectivity program 120 cooperate to: (1) download the connectivity map (via subprogram 410); (2) improve or update the connectivity map (via subprogram 420); and (3) leverage the connectivity map (via subprogram 430). Each subprogram may cycle (i.e., repeat) at a respective independent cycling frequency. Each subprogram may be a separate and distinct program configured to interface with the other subprograms.

The downloading subprogram 410 is configured to download a connectivity map from the external servers 110 for subprograms 420 and 430. In step 411, the downloading subprogram 410 receives a geographic destination. A user may supply the destination. A program may supply the destination. A single destination point is not necessary. In various embodiments, the destination is a plurality of possible destinations.

In step 412, the downloading subprogram 410 downloads the connectivity map 510 or a portion of the connectivity map 510 from the servers 110. The connectivity map (or portion thereof), as described below with reference to FIG. 5, may include projected or anticipated connectivity in a region. The connectivity map may also include a sampling plan for the region. The region may be various routes leading from the user's present location to the destination. The connectivity map may be one of many connectivity maps, each tied to a different provider of wireless service (e.g., one map for AT&T, another map for Verizon). In various embodiments, a particular connectivity map for a particular service provider corresponds to a certain class of service (e.g., 3G or 4G). In other embodiments, various classes of service are marked as such on a single connectivity map. If the downloading subprogram 410 does not receive a destination in step 411, then the connectivity map may be of a region surrounding the user. If the downloading subprogram 410 does receive a destination, then the connectivity map may be of a region surrounding the user plus projected routes leading from the user's present location to the destination.

In various embodiments, a size or scope of the portion of the downloaded map depends on one or more of: (a) a user selection, (b) connectivity (or connectivity demand as described below) of destination, projected destination, and a path leading from a current location to the destination or projected destination, (c) one or more driving properties such as vehicle speed, (d) one or more jurisdictional properties such as speed limits, traffic incidents, and disruption of other types (e.g., weather or construction) along potential routes, (e) one or more factors as described below in relation to the updating subprogram 420, and (f) an expected or projected speed.

In various embodiments, the number of downloaded maps depends on one or more of the above variables. For example, the downloading subprogram 410 may initially download a map corresponding to (or only including) a user's preferred connectivity such as 4G connectivity. If the downloading subprogram 410 anticipates connectivity through the preferred connectivity below a predetermined threshold, the downloading subprogram 410 may then download a map (or download an additional portion of the map) corresponding to another level of connectivity such as 3G connectivity.

As discussed above, the downloading subprogram 410 cycles. The cycling frequency may be user adjustable. The cycling frequency may at least partially depend on connectivity of one or more of the destination, one or more projected destinations, and a region surrounding the user. In various embodiments the process of cycling re-uses and updates an old connectivity map stored in the vehicle 100 to conserve data.

The updating subprogram 420 applies the connectivity map. The updating subprogram 420 is configured to update or improve the complete connectivity map stored in the external server by measuring or sampling connectivity.

In step 421, a user or manufacturer may apply settings. Settings may include a maximum sampling rate, a minimum sampling rate, a default sampling rate, sampling on/off, instructions on how to perform sampling, and other options that effect sampling.

In step 422, the updating subprogram 420 may measure or receive driving properties of the vehicle 100. Driving properties include variable features of the vehicle, such as its position or location, speed, acceleration, decelerating, level of fuel, and current activity of its lights or horn. Driving properties may also include some fixed features of the vehicle, such as its size, length, and width.

In step 423, the updating subprogram 420 may measure or receive factors. Factors may include any measured or recorded state of the outside world include time, day, any weather related factor including temperature, humidity, dew point, and wind, traffic density, connected vehicle (i.e., vehicles configured to measure connectivity and upload to the same server or group of servers) density or quantity, traffic incidents and disruption of other types, road geometry (e.g., grade, elevation, width, and length), road class, and road surface condition (e.g., dry or wet).

As shown in FIG. 4, the updating subprogram 420 may receive a most recent version of the connectivity map including the sampling plan from the downloading subprogram 410.

In step 424, the updating subprogram 420 applies information measured or received in one or more of steps 412, 421, 422, and 423 to generate or select sampling. As shown in steps 425 and 425, sampling includes a sampling rate 425 and a sampling quality 426.

Sampling rate 425 refers to measurement speed or timing. Sampling, could for example, occur once ever minute, second, or millisecond. Sampling quality 426 refers to measurement detail. Some samples could be highly detailed, measuring all connectivity aspects or dimensions. Other samples could be simple, measuring only a few connectivity aspects or dimensions.

In various embodiments, sampling 424 is at least a function of connected vehicle density and a demand for connectivity information ("demand"). In various embodiments, demand is the sum of data requirements for critical vehicle programs and typical or average data requirements for non-critical vehicle programs such as programs directed to entertainment. In these embodiments, as the connected vehicle density increases, the sampling rate or sampling quality of individual vehicles may decrease until a minimum nominal number has been reached. Conversely, as the connected vehicle density decreases, the sampling rate or sampling quality of individual vehicles may increase until a maximum nominal number has been reached. Similarly, as the demand increases, the sampling rate or sampling quality of individual vehicles may increase. As the demand decreases, the sampling rate or sampling quality of individual vehicles may decrease. Minimum and maximum nominal sampling rates ensure that some level of sampling is maintained and that a particular vehicle does not occupy excessive bandwidth. In various embodiments, the vehicle samples in step 424 according to the sampling plan. It should thus be appreciated that the updating subprogram 420 is configured to sample with or without a sampling plan.

In various embodiments, the updating subprogram 420 includes a transmitting subprogram 600 (shown in FIG. 6) configured to transmit samples from the vehicle 100 to the external server hosting the connectivity map. In step 601, the transmitting subprogram 600 receives samples from the updating subprogram 420. In step 602, the transmitting subprogram 600 receives the anticipated connectivity corresponding to the samples from the leveraging subprogram 430. In step 603, the transmitting subprogram 600 compares the connectivity samples with the anticipated connectivity. In various embodiments, the transmitting subprogram 600 appends the driving properties, factors, and carrier (and kind of service e.g., 3G or 4G) to the samples, enabling the external server hosting the connectivity map to associate a received connectivity with a location or factors such as time and weather. In steps 604 to 606 the transmitting subprogram transmits the samples to the external server hosting the connectivity map 604, stores the connectivity samples in the vehicle memory 605, or discards or deletes the connectivity samples 606.

In various embodiments, the transmitting subprogram 600 transmits the connectivity samples in step 604 when the transmitting subprogram 600 detects (a) a predetermined discrepancy degree between connectivity samples and the anticipated connectivity derived from the connectivity map, and (b) an acceptable transmission window. In various embodiments, a compression degree of the transmitted samples is based on a degree of conformity between the samples and the anticipated connectivity.

In various embodiments, the transmitting subprogram 600 stores the connectivity samples in response to (a) a predetermined discrepancy degree between connectivity samples and the anticipated connectivity derived from the connectivity map, and (b) a negative or unacceptable transmission window.

The transmitting subprogram 600 transmits stored connectivity samples when the transmission window changes from unacceptable to acceptable. In various embodiments, the transmission window depends on one or more of (1) available uploading bandwidth, (2) price of bandwidth, (3) whether the vehicle is connected to the Internet via cellular data or a fixed network, such as WiFi, (4) current connectivity as indicated by the samples, (5) anticipated connectivity as indicated by the connectivity map.

In various embodiments, the transmission window changes based on the discrepancy between the connectivity sample and the anticipated connectivity. In these embodiments, as the discrepancy increases, the transmission window widens. In various embodiments, the transmitting subprogram 600 stores all samples, including transmitted samples, until the external server confirms safe receipt.

In various embodiments, the transmitting subprogram 600 discards the connectivity samples in step 606 in response to detecting zero discrepancy or a discrepancy less than the predetermined discrepancy degree (i.e., sufficient conformity between the connectivity samples and the anticipated connectivity). In these embodiments, the transmitting subprogram 600 may transmit data to the external servers 110 indicating that the measured or sampled connectivity conformed to the projected or anticipated connectivity, enabling the external servers 110 to confirm validity of its existing connectivity data. In these embodiments, the transmitted data may include compressed or less detailed samples. In various embodiments, a confirmed validity causes the external servers 110 to update the connectivity map to reflect the confirmed validity.

Returning to FIG. 4, the updating subprogram 420 cycles at a frequency. The frequency may depend on any of the factors described above in relation to cycling of other programs or subprograms. In various embodiments, the cycling frequency depends on a comparison (not shown) between connectivity samples from the updating program 420 and anticipated connectivity projected by the leveraging subprogram 430. In various embodiments, a mismatch or discrepancy between observed samples and anticipated samples causes the updating subprogram 420 to execute one or more of increasing the sampling rate, increasing the sampling quality, and increasing the cycling rate one or more of the subprograms 410, 420, or 430.

It should be appreciated that the updating subprogram 420 may independently and simultaneously sample connectivity from different carriers or different service levels from the same carrier. For example, the updating subprogram 420 may be configured to simultaneously sample AT&T 3G service and Verizon 4G service.

With reference to FIG. 4, the leveraging program 430 receives the connectivity map, the driving properties in step 431, and the factors in step 437. The leveraging program 430 projects or anticipates connectivity in light of those inputs. The leveraging program may project or anticipate connectivity in terms of a geographic region surrounding a user. In various embodiments, the geographic region includes or is limited to one or more anticipated user paths. In various embodiments, the size or length of the geographic region/expected path depends on the driving properties (e.g., current speed and traffic density), the factors, and information extracted from the connectivity map. In various embodiments, the leveraging program 430 anticipates connectivity in light of a plurality of carriers (if the vehicle is configured to receive cellular signals from the plurality of carriers) or in light of a plurality of service levels corresponding to a single carrier (e.g., anticipates 4G connectivity and 3G connectivity). In various embodiments, the leveraging subprogram 430 anticipates connectivity of a preferred service level (e.g., 4G) then anticipates connectivity of a different service level (e.g., 3G) if the preferred service level has poor connectivity in light of the vehicle's expected connectivity demand (described above).

In step 433 the leveraging subprogram 430 selects or generates instructions for other programs or systems in light of anticipated connectivity. In particular, the leveraging subprogram may adjust a schedule in which other programs transmit or receive data (step 434), adjust a rate or quantity that other programs buffer (step 435), or perform any other function that leverages anticipated connectivity (step 436). These other functions may include pausing, resuming, canceling, accelerating, or decelerating data transfer for a particular feature or program. In various embodiments, the leveraging subprogram 430 sends anticipated connectivity to other programs, which interpret and leverage the data using their own algorithms. In various embodiments, programs operatively coupled to the connectivity program 400 are ranked as vital or non-vital. In various embodiments, anticipated poor connectivity causes vital programs to buffer. In various embodiments, anticipated poor connectivity causes the vehicle to prioritize data transmission related to vital programs and to abort or pause data transmission related to non-vital programs. In these embodiments, the data transmission related to non-vital programs may automatically resume when the leveraging subprogram 430 anticipates sufficient connectivity. In various embodiments, the leveraging subprogram 430 is selects connectivity ranges corresponding to sufficient connectivity and poor connectivity based on a projected connectivity usage. In various embodiments, the projected connectivity usage is demand for connectivity, as described above.

Figure 5:
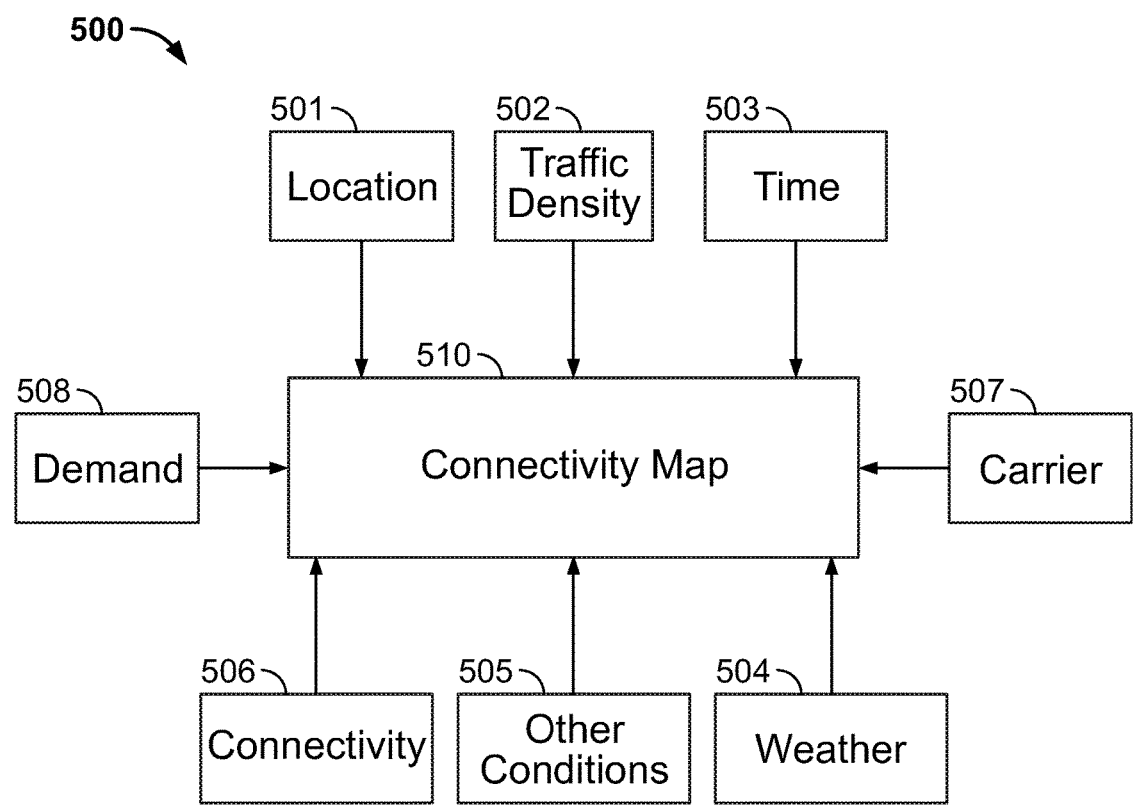
FIG. 5 is a block diagram showing various features of a connectivity map.

Turning now to FIG. 5, the connectivity map 510, stored on the external servers 110, includes, at any mapped location, connectivity 506, demand for connectivity information 508, and carrier 507. In these embodiments, the connectivity map 510 applies a function that adjusts or normalizes sampled connectivity for time 503, traffic density 502, weather 504, and other conditions 505. In these embodiments, for example, a connectivity sampled during rain would be adjusted or normalized to a connectivity value expected in an absence of rain. As another example, a connectivity sampled during an exceptional traffic density may be normalized to a connectivity value expected in typical or average traffic density.

The demand for connectivity information 508 in a specific area or region may be a function of a quality or quantity of existing connectivity information, an age of existing connectivity information, and an average traffic density.

As discussed above, the external server 110 may generate a sampling plan for connected vehicles in light of the connectivity map 510. Turning now to FIG. 7, one example of a portion 700 of a sampling plan is generally shown and illustrated. As discussed above, the portion 700 may received or downloaded in step 412. The portion 700 includes a start or present location 705, an end or destination 707, and projected routes or paths 707 and 708. Here, the portion 700 includes regions or areas 701 to 704 with outdated or questionable connectivity information. The size or resolution of the areas 701 to 704 may be adjustable. In response, the vehicle 100 samples connectivity (or enhances one or more of the sampling rate and sampling quality) in areas 701 to 704.

It should be appreciated that for the purposes of the claims, a "loaded vehicle" is hereby defined to be a vehicle comprising a steering system, an acceleration system with an engine or motor, a braking system including brakes configured to decelerate the vehicle, wheels, wherein at least one of the wheels is configured to receive torque generated by the engine or motor, one or more seats, at least one processor, and memory operatively coupled to the processor. It should be appreciated that the above definition applies, and only applies, when the claims specifically include the term "loaded vehicle."

It should be appreciated that for the purposes of the claims, the term "simultaneously," as it relates to a computer program, conveys that the programs are queued for immediate processing (or being processed) at the same time. The term "simultaneously" does not require that the processor actually simultaneously execute the two programs. In other words, the term "simultaneously" covers a situation where a single core of a processor is tasked with executing two threads of software.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

The invention claimed is:

1. A system comprising:
a vehicle including antenna;
a connectivity program operatively coupled with the antenna, configured to:
receive a connectivity map and sampling plan comprising a first sampling region associated with a first non-zero sampling rate and a second sampling region associated with a second non-zero different sampling rate,
select a sampling rate based on the sampling plan,
sample connectivity,
transmit samples,
anticipate connectivity based on the connectivity map, and
generate an instruction for another program based on an anticipated connectivity.

2. The system of claim 1, wherein the connectivity map has a scope, the connectivity program is configured to select the scope based on a received value, and the connectivity program is configured to simultaneously anticipate connectivity of a plurality of different service levels of a single service provider.

3. The system of claim 1, wherein the connectivity program is configured to append both of a time data and a weather-related data to the samples.

4. The system of claim 1, wherein the connectivity program is configured to compute a discrepancy degree between a sampled connectivity and an anticipated connectivity.

5. The system of claim 4, wherein the connectivity program is configured to compress the samples based on the discrepancy degree.

6. The system of claim 1, wherein the connectivity program is configured to delay transmitting the samples in response to detecting an unacceptable transmission window.

7. The system of claim 1, wherein the instruction is a plurality of instructions including a pause instruction, a resume instruction, and a buffering instruction; the pause instruction is configured to pause mobile data transfer of the other program, the resume instruction is configured to resume mobile data transfer of the other program, and the buffering instruction is configured to cause a preemptive download of information for the other program.

8. The system of claim 1, wherein the connectivity program is configured to transmit the instructions to a plurality of other programs, and the plurality of other programs are stored on the vehicle and configured to receive the instructions from the connectivity program.

9. The method of claim 1, further comprising:
transmitting the instructions to a plurality of other programs that are stored on the vehicle and configured to receive the instructions from the connectivity program.

10. A method of mapping connectivity with a vehicle having an accelerator, brakes, steering, a cellular network antenna, a processor, and memory, comprising:
operatively coupling a connectivity program with the antenna, and with the connectivity program:
receiving a connectivity map and sampling plan comprising first and second sampling regions,
selecting a first non-zero sampling rate with the connectivity program based on the first sampling region,
selecting a second non-zero different sampling rate with the connectivity program based on the second sampling region,
sampling connectivity at a plurality sampling qualities,
transmitting samples,
anticipating connectivity based on the connectivity map, and
generating an instruction for another program based on an anticipated connectivity.

11. The method of claim 10, wherein the connectivity map has a scope, the method further comprising:
selecting the scope based on a received value;
simultaneously anticipating connectivity of a plurality of different service levels of a single service provider.

12. The method of claim 10, further comprising:
appending both of a time data and a weather-related data to the samples with the connectivity program.

13. The method of claim 10, further comprising:
computing a discrepancy degree between the sampled connectivity and an anticipated connectivity.

14. The method of claim 13, further comprising:
compressing the samples with the connectivity program based on the discrepancy degree.

15. The method of claim 10, further comprising:
delaying the transmission of the connectivity samples with the connectivity program in response to detecting an unacceptable transmission window.

16. The method of claim 10, wherein the instruction is a plurality of instructions including a pause instruction, a resume instruction, and a buffering instruction; the pause instruction is configured to pause mobile data transfer of the other program, the resume instruction is configured to resume mobile data transfer of the other program, and the buffering instruction is configured to cause a preemptive download of information for the other program.

17. A method of mapping network connectivity in a vehicle comprising: receiving, via an antenna, a connectivity map and sampling plan comprising first and second sampling regions associated with respective first and a second different non-zero sampling rates; sampling the network connectivity at a sampling rate selected base on the sampling plan; anticipating, via a processor, the network connectivity based on the connectivity map; and generating instructions for another program based on an anticipated network connectivity.

* * * * *